US010582117B1

(12) United States Patent
Tanaka et al.

(10) Patent No.: US 10,582,117 B1
(45) Date of Patent: Mar. 3, 2020

(54) AUTOMATIC CAMERA CONTROL IN A VIDEO CONFERENCE SYSTEM

(71) Applicants: Ryo Tanaka, Concord, MA (US); Pascal Cleve, Sudbury, MA (US)

(72) Inventors: Ryo Tanaka, Concord, MA (US); Pascal Cleve, Sudbury, MA (US)

(73) Assignee: Yamaha-United Communications, Sudbury, MA (US)

( * ) Notice: Subject to any disclaimer, the term of this patent is extended or adjusted under 35 U.S.C. 154(b) by 0 days.

(21) Appl. No.: 16/401,196

(22) Filed: May 2, 2019

(51) Int. Cl.
| | |
|---|---|
| *H04N 5/232* | (2006.01) |
| *H04N 7/15* | (2006.01) |
| *G06F 3/01* | (2006.01) |
| *H04N 7/14* | (2006.01) |
| *H04N 5/247* | (2006.01) |
| *G06T 7/73* | (2017.01) |
| *G10L 25/78* | (2013.01) |
| *H04R 1/32* | (2006.01) |

(52) U.S. Cl.
CPC ......... *H04N 5/23219* (2013.01); *G06F 3/013* (2013.01); *G06T 7/73* (2017.01); *G10L 25/78* (2013.01); *H04N 5/23299* (2018.08); *H04N 5/247* (2013.01); *H04N 7/142* (2013.01); *H04N 7/15* (2013.01); *H04R 1/326* (2013.01); *G06T 2207/30196* (2013.01); *H04N 5/23296* (2013.01)

(58) Field of Classification Search
CPC .......... H04N 5/23219; H04N 5/23299; H04N 5/247; H04N 7/142; H04N 7/15; H04N 5/23296; G06T 7/73; G06T 2207/30196; H04R 1/326; G06F 3/013; G10L 25/78
See application file for complete search history.

(56) References Cited

U.S. PATENT DOCUMENTS

| | | | | |
|---|---|---|---|---|
| 8,872,878 B2* | 10/2014 | Byers | ................... | G06F 3/1446 348/14.07 |
| 2002/0196328 A1* | 12/2002 | Piotrowski | ..... | H04N 21/234318 348/14.12 |
| 2012/0293606 A1* | 11/2012 | Watson | .................. | H04N 5/232 348/14.16 |
| 2014/0063176 A1* | 3/2014 | Modai | ................ | H04N 5/23219 348/14.05 |
| 2018/0176508 A1* | 6/2018 | Pell | ........................ | H04N 7/147 |
| 2019/0158733 A1* | 5/2019 | Feng | .................. | H04N 5/23219 |
| 2019/0260965 A1* | 8/2019 | Morabia | ............. | H04L 65/1089 |

\* cited by examiner

*Primary Examiner* — Stella L. Woo
(74) *Attorney, Agent, or Firm* — Robert Schuler

(57) ABSTRACT

A video conference system operates to identity and to determine a location of things in a conference room, and to determine an orientation of video conference participants towards the identified things, and uses an assigned priority of the things that the participants are oriented towards to automatically control a camera to focus on the highest priority thing.

24 Claims, 13 Drawing Sheets

FIG. 7

| ID LIST | FEATURES | LOC. | ORIENTATION | SPEAKER STATUS | TARGET |
|---|---|---|---|---|---|
| PART.1 | PART.1 FEAT. | PART.1 LOC. | ◁° | ACTIVE | WB |
| PART.2 | PART.2 FEAT. | PART.2 LOC. | • | INACTIVE | WB |
| PART.3 | PART.3 FEAT. | PART.3 LOC. | • | INACTIVE | WB |
| PART.4 | PART.4 FEAT. | PART.4 LOC. | ▷° | INACTIVE | WB |
| WHITE BRD | | WHITE BRD LOC. | | | |
| TABLE | | TABLE LOC. | | | |
| LAPTOP | | LAPTOP LOC. | | | |

INFORMATION STORE 215

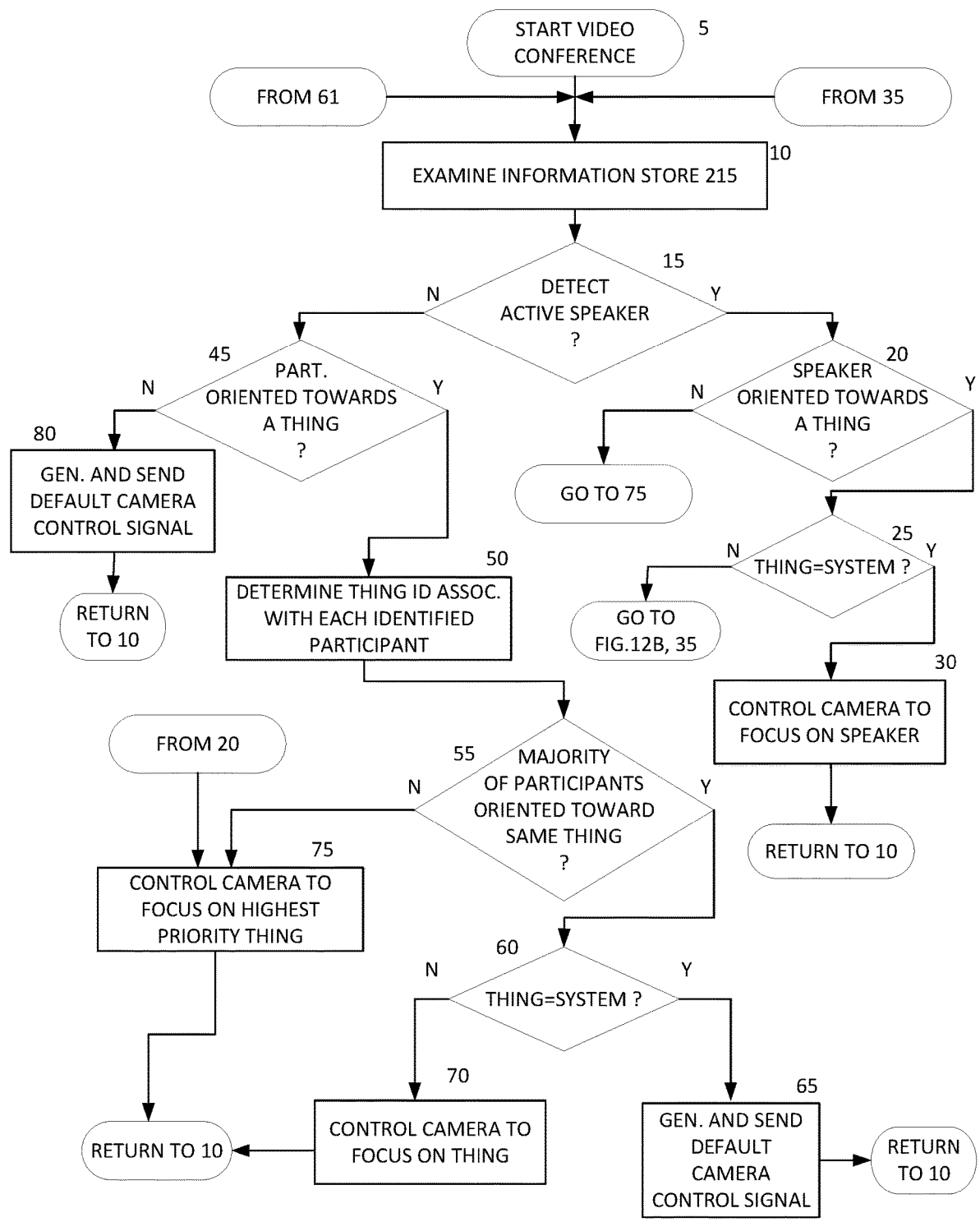
Fig.12A  CAMERA CONTROL LOGIC 220

AUTOMATIC CAMERA CONTROL IN A VIDEO CONFERENCE SYSTEM

1. FIELD OF THE INVENTION

The present disclosure relates to video conference system camera control based upon orientation of conference call participants.

2. BACKGROUND

Video conference systems are typically used to enhance a conference call experience for participants at two or more locations that are remote with respect to each other. An advantage in conducting a video conference call is that participants at a local, or near-end location, are able to see and more easily interact with participants at another, remote or far-end location. In this regard, participants are able to view each other and to interactively discuss visual aids, such as a white board, used during the course of the call. The ability for participants at both ends of a call to view and more effectively interact with visual aids and remote participants during the course of the call greatly enhances the effectiveness of the conference call.

Video conference systems typically include some number of microphones, at least one loudspeaker, a camera and functionality that operates to automatically control the camera pan, tilt and zoom, a display and signal processing functionality that operates to filter or in other ways modify multi-media signals received by the system from the local environment prior to sending the signals to a remote communication device. More specifically with respect to the automatic camera control functionality, participant location, active speaker detection and speaker movement methodologies are commonly used to control a conference camera to focus on an active speaker or speakers and to track their movement in a conference room.

For some computer applications, the orientation (gaze/pose) of an individual can be useful for the purpose of controlling the operation of the application. For example, gaze or pose information can be used to control the operation of a browser running on a computer or control the operation of a virtual reality application or a self-driving car application. In this regard, the gaze direction or pose of an individual operating the computer (i.e., sitting in front of a computer or wearing a computer device running a virtual reality application) can be detected and used in the same manner that a computer mouse is used to control the operation of the application.

3. BRIEF DESCRIPTION OF THE DRAWINGS

The present invention can be best understood by reading the specification with reference to the following figures, in which.

Figure 5:
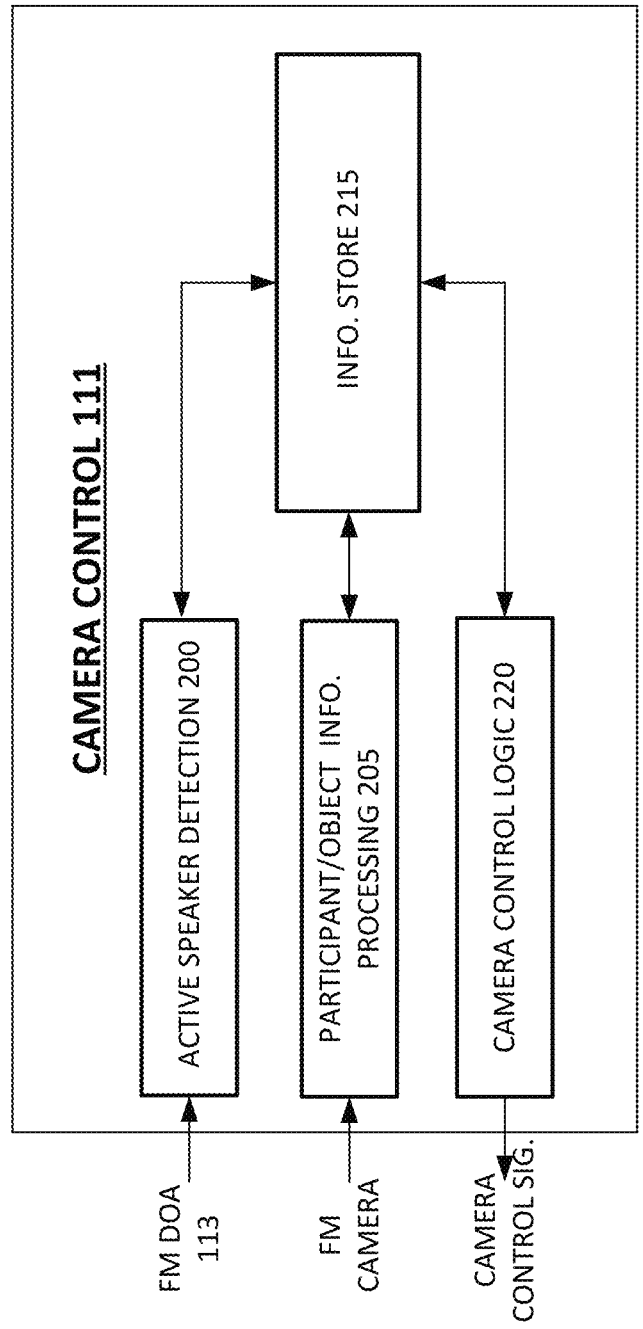
FIG. 5 is a diagram showing functional blocks comprising a camera control module 111 comprising the video conference system 110.
Figure 6:
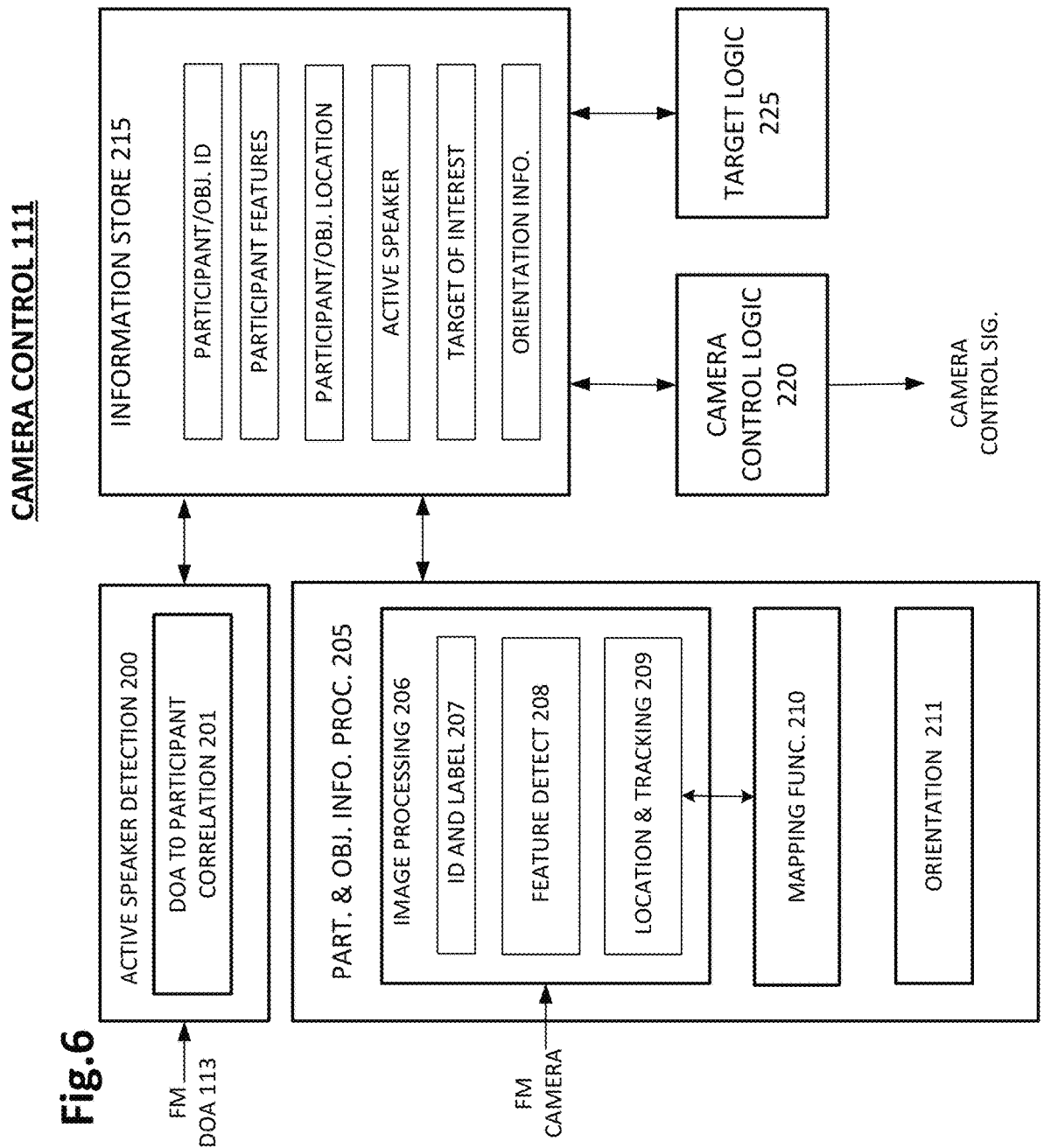

FIG. 6 a diagram illustrating functionality comprising the camera control module 111 of FIG. 5 in more detail.

FIG. 7 is a diagram illustrating an information store 215 comprising the camera control functionality 111.

Figure 8:
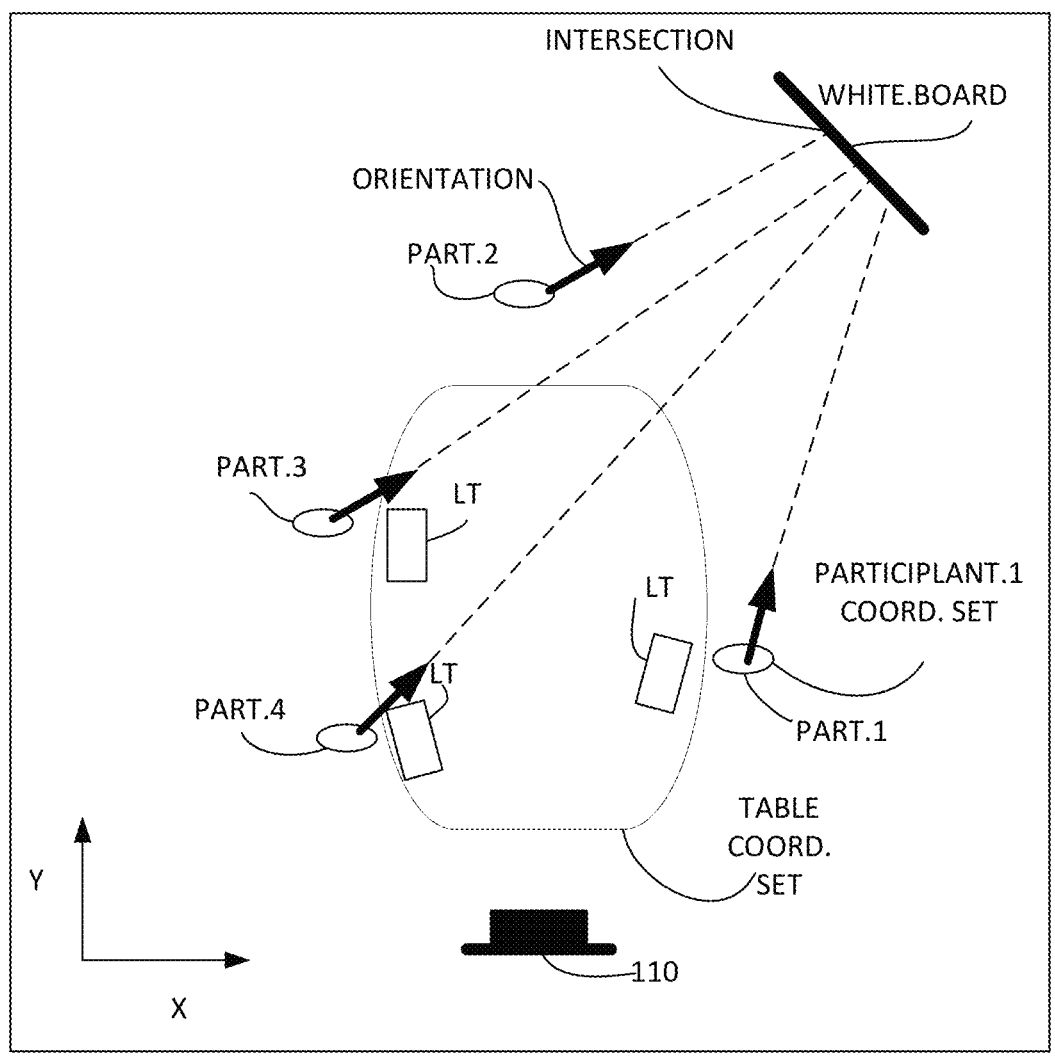

FIG. 8 a diagram illustrating a virtual conference room map showing the location of things and the orientations of participants in the room.

Figure 9:
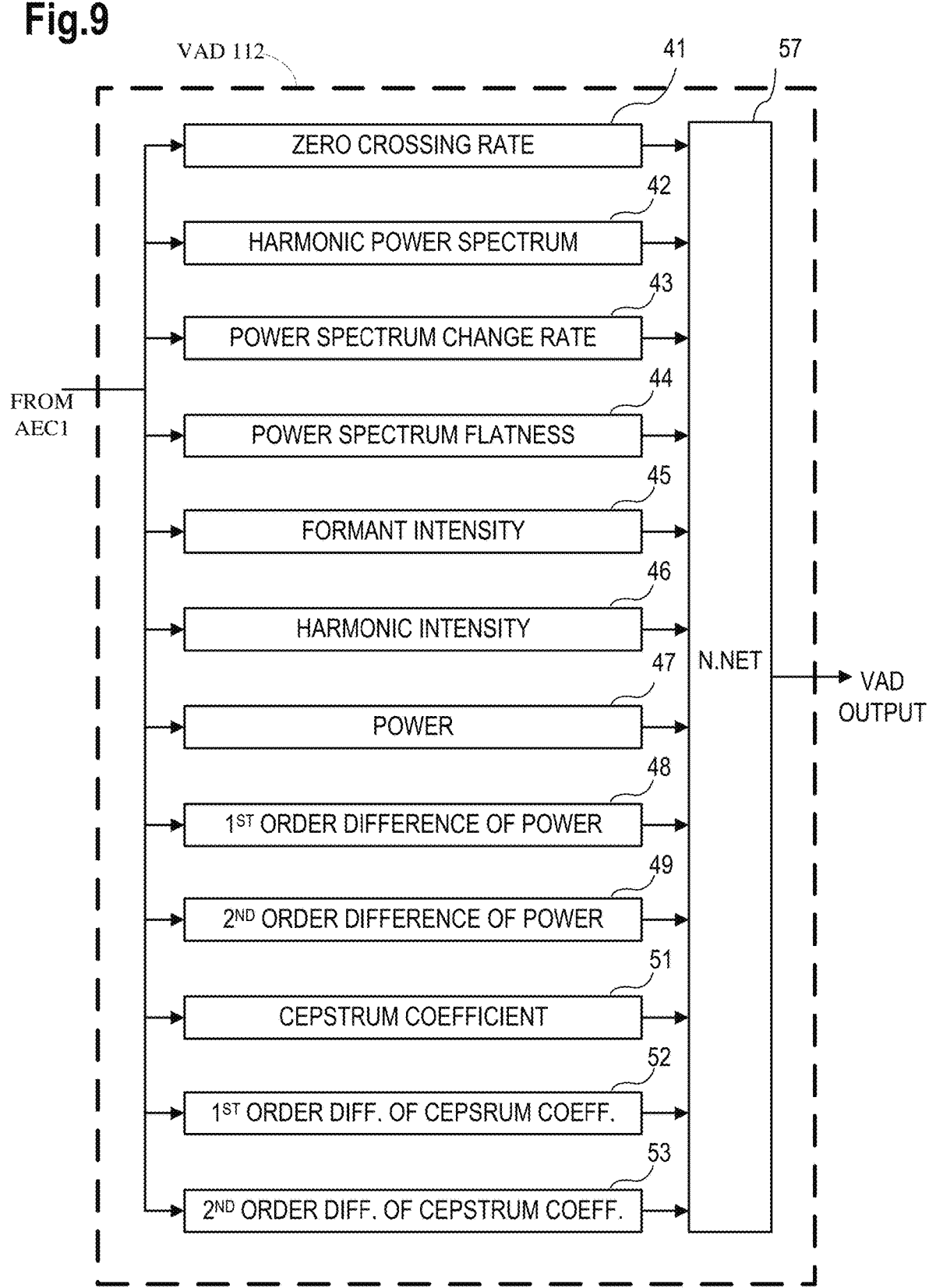

FIG. 9 is a diagram showing functionality comprising a voice activity detector (VAD) 112.

Figure 10:
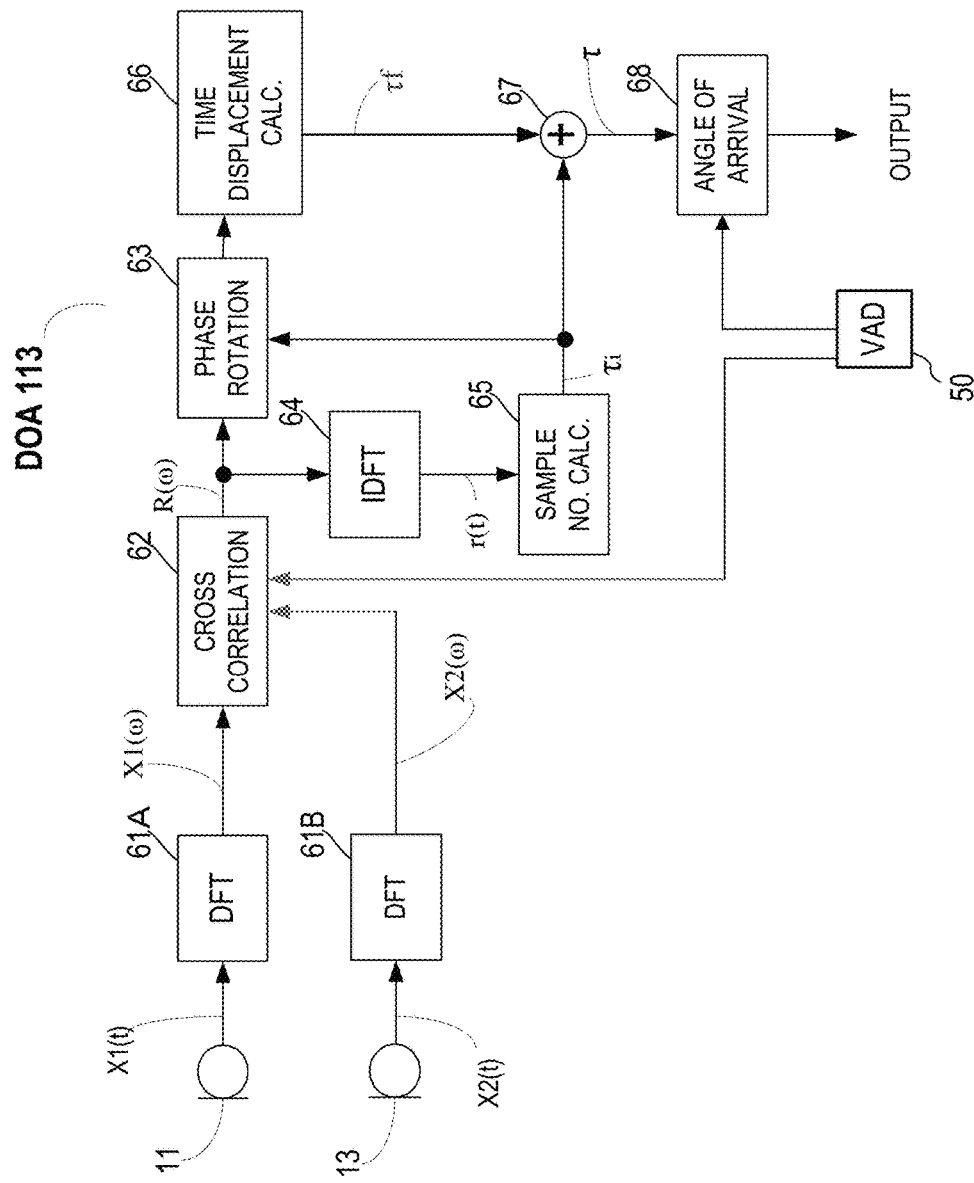

FIG. 10 is a diagram showing functionality comprising a direction of arrival (DOA) functionality 113.

Figure 11:
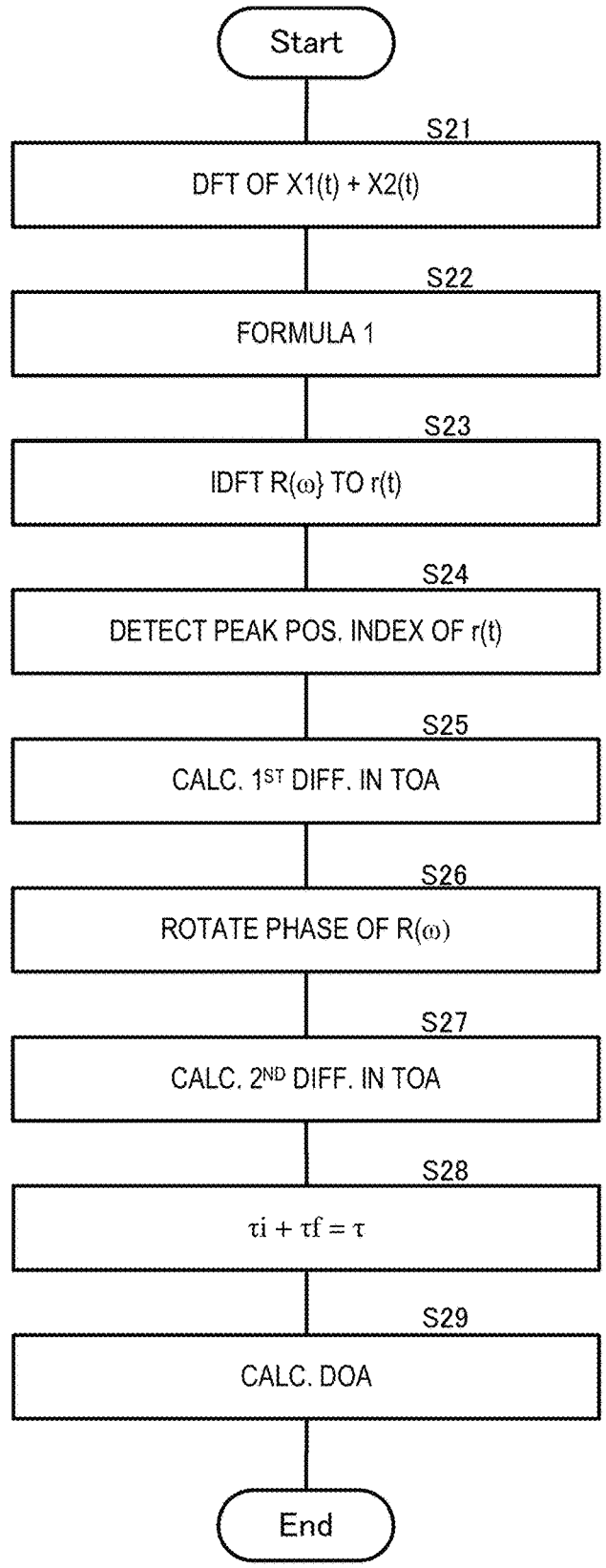

FIG. 11 is a diagram illustrating a process for determining a direction of arrival of sound using the functionality in FIG. 10.

Figure 12B:
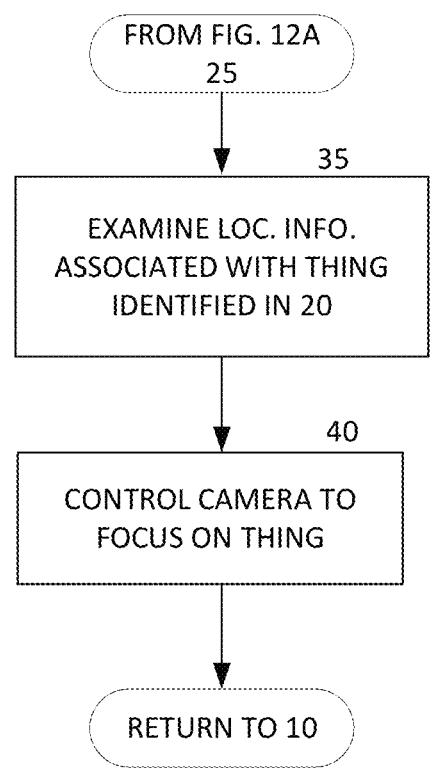

FIGS. 12A and 12B is a logical flow diagram illustrating a process for generating signals to automatically control a camera comprising the video conference system.

4. DETAILED DESCRIPTION

While the use of active speaker identification and tracking technology has improved the manner in which a video conference system camera field of view is automatically controlled, there are still shortcomings associated with this technology. For example, current video conference systems are not able to focus the camera field of view towards an object that can be determined to be of most interest to remote participants. In this regard, current automatic camera control functionality is typically limited to detecting speech, associating the speech with a meeting participant, and then controlled the camera to focus on that participant. As a new active speaker is detected, the camera is automatically controlled to focus on the new, active speaker. Alternatively, the camera can be manually controlled so that its field of view encompasses all participants in a conference room.

In order to further improve the video conference call experience for the participants, we have discovered that participant orientation information can be utilized to automatically control a camera associated with a local video conference system to focus on a thing (participant and/or object) that is determined by the video conference system to be of interest during a conference call. According to one embodiment, an orientation of each participant in a video conference call is determined, a thing (participant or object) that each participant is looking at is identified, and a video conference system camera is automatically controlled to focus on the thing that a highest priority participant is looking at. According to this embodiment, participant orientation can be determined using gaze and/or pose information, an active speaker can be assigned to be the highest priority participant, and the thing can be either a participant or an inanimate object.

According to another embodiment, if no active speaker is detected, then the video conference system camera can be controlled to focus on a highest priority thing (participant or inanimate object) that any of the participants are oriented towards. In this regard, the conference system can be configured to determine a priority for things identified in a conference room, and then control a camera to focus on the highest priority thing.

According to another embodiment, the conference system camera can be controlled to focus on a thing that a majority of the participants are determined to be oriented towards, regardless of the priority assigned to the thing.

According to yet another embodiment, the default camera control instruction can be to focus on all of the participants (no active speaker, no two participants or a majority not looking at same object).

Figure 1:
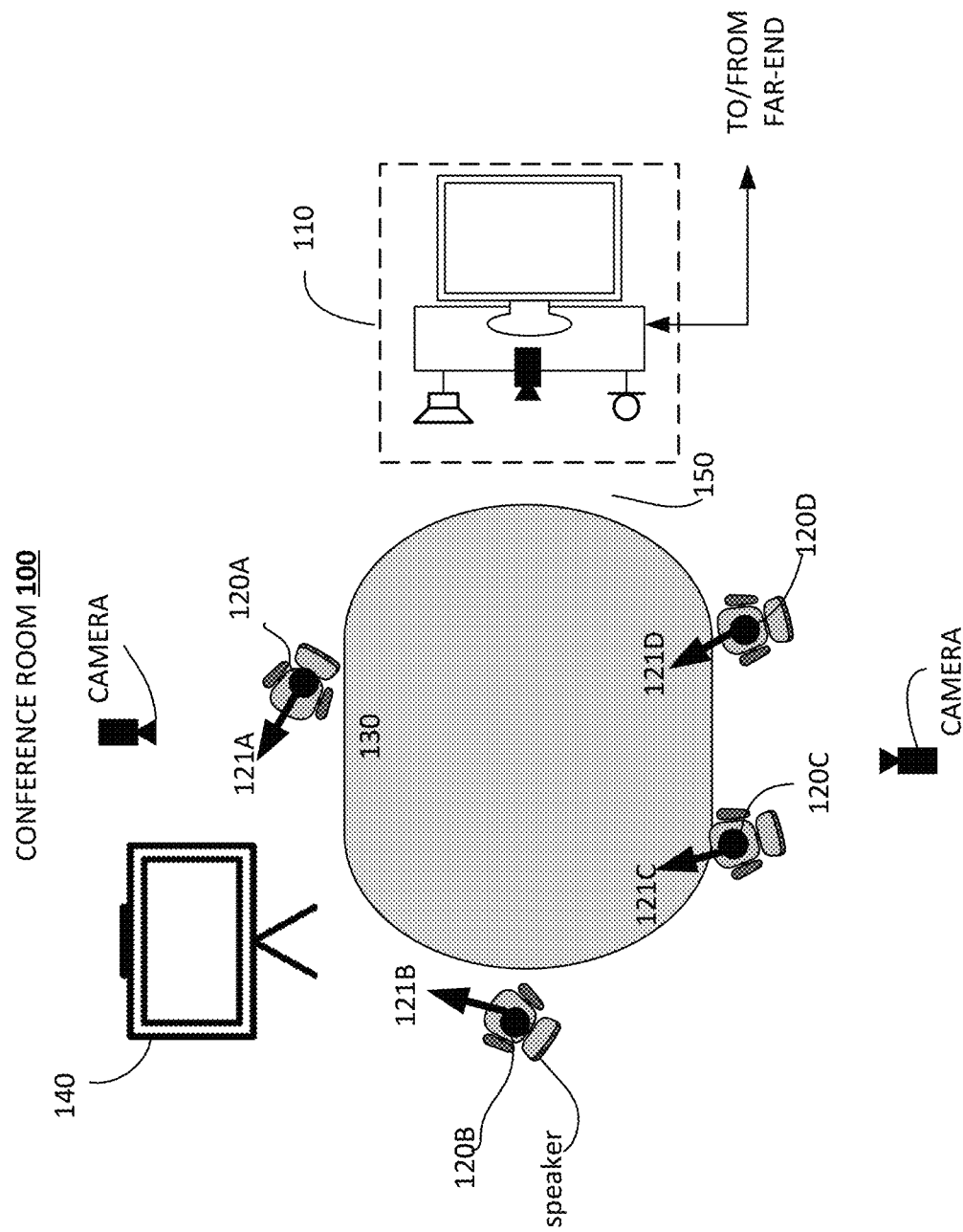
FIG. 1 is an illustration showing a conference room 100 having a video conference system 110, participants sitting around a conference table gazing in a direction of a white board, and showing objects in a conference room.

Turning now to a detailed description of the embodiments, in which FIG. 1 is an illustration of a conference room 100 having a video conference system 110, four conference call participants labeled 120A-D, a conference table 130 and a white board 140 or other type of electronic or non-electronic object that serves to display presentation or other information. The conference system 110 is comprised of audio/video signal processing, a network interface module, a video display, one or more speakers, at least one camera and two or more microphones. As will be described later in detail, the conference system 110 signal processing functionality can be trained to detect, identify and determine the position of things (objects and individuals) located in the conference room 100, detect speech activity associated with the individual participants, detect the orientation of each participant with respect to the system 110 camera and use this orientation information to determine what things the participants are looking at. The conference system then uses some or all of this information to control any or all of a pan, tilt and zoom of the conference system 110 camera to focus on particular object, participant(s) or both. Alternatively, two or more cameras can be connected to the system 110, with at least one of these cameras being positioned in the room 100 remotely from the system 110. During operation, any one of the cameras can be selected to capture images depending upon what thing the system identifies to be of interest to participants at a far-end system.

According to the embodiment illustrated with reference to FIG. 1, while the conference system detects that an active speaker (participant 120B) is looking at the white board 140, the conference system 110 can operate to control the camera to focus on the whiteboard. More specifically, once the conference system identifies the highest priority participant (i.e., an active speaker), and the thing that this speaker is looking at is identified (in this case the whiteboard 140), then the camera can be controlled to focus on the whiteboard. Alternatively, in the event that the system 110 does not detect an active speaker, the thing (i.e., object or participant) that each participant is oriented towards (i.e., looking at) can be identified, and the camera can be controlled to focus on the highest priority thing that is being looked at.

While it is only necessary to detect the orientation (gaze and/or pose) of the participants and the identity of the thing that each participant is looking at to control the focus of the system camera, the additional speaker information can be used to reinforce the determination by the system that the whiteboard is very likely the thing of highest interest, at least during the time that the person is speaking (which in the case of FIG. 1 is the participant labeled 120B). According to this description, the conference system identifies a participant as an active speaker if speech information associated with any of the participants is detected for longer than a configurable period of time (threshold time). Conference system functionality that operates to determine what the conference participants are looking at will be described in detail later at least with reference to FIG. 6.

Figure 2:
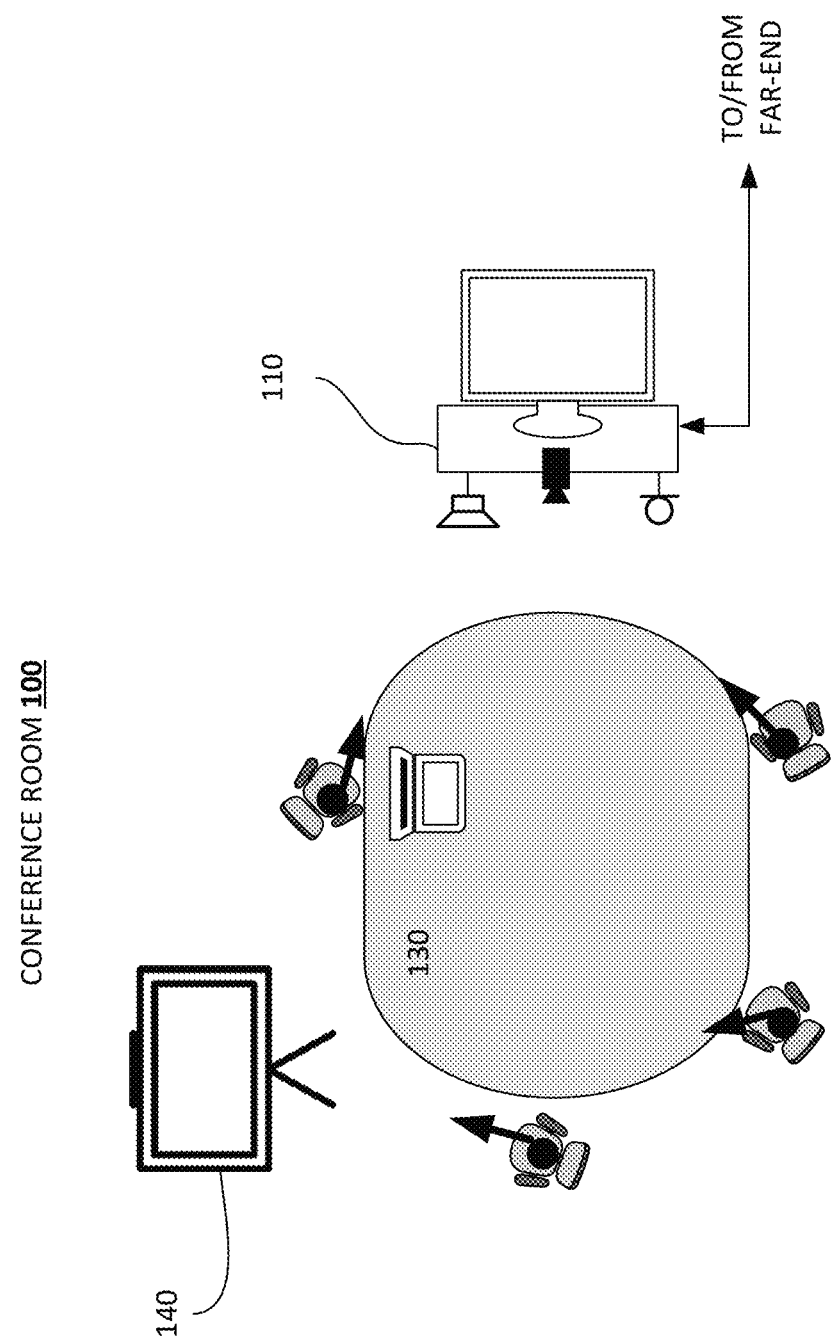
FIG. 2 is similar to FIG. 1 with participants gazing in a direction toward the video conference system.

FIG. 2 shows the same conference room 100 arrangement as illustrated in FIG. 1. However, in this case, the system does not detect an active speaker and the system determines that at least one of the participants is oriented towards the whiteboard 140, which in this case has been configured to be the highest priority object in the room. According to this case, the conference system operates to control the camera to focus on the whiteboard. During the course of a conference call, the system may detect speech information that is associated with one or more of the four participants, but if none of the participants are identified as active speakers, (speech information associated with a participant is not detected for longer than the configurable period of time) then the camera focus remains on the whiteboard. The current camera focus can be dynamically and automatically changed depending upon what participants are currently looking at and the priority of the thing they are looking at, and/or depending upon changing active speaker information.

Figure 3:
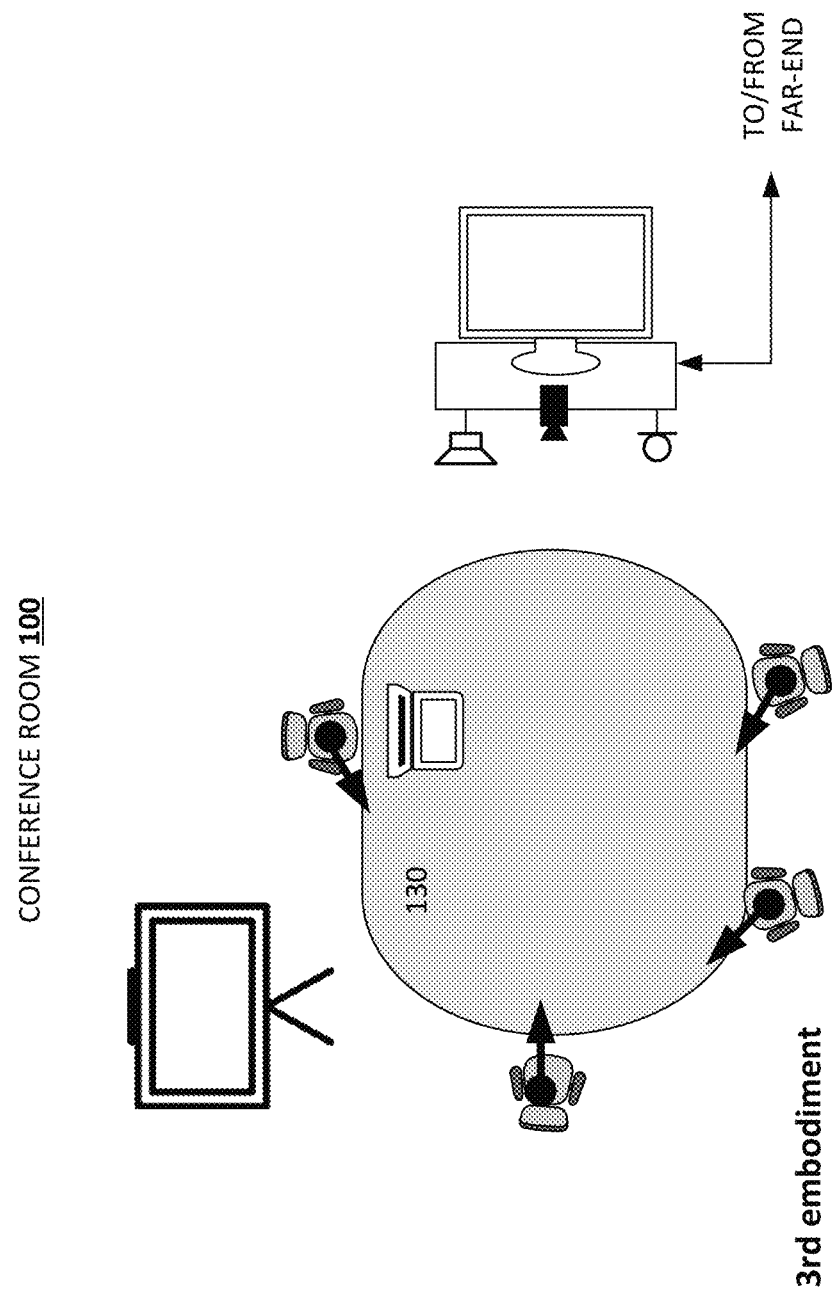
FIG. 3 is similar to FIGS. 1 and 2 with the participants gazing in different directions.

FIG. 3 shows the same conference room arrangement as illustrated in FIGS. 1 and 2, but with the conference system detecting that at least a majority of the four participants are oriented towards one participant who may or may not be identified by the system as being an active speaker. According to this embodiment, while the conference system detects that at least a majority of the participants are oriented towards one of the other participants, it operates to control the camera to focus on that participant for as long as the majority of the other participants are oriented in that direction.

Figure 4:
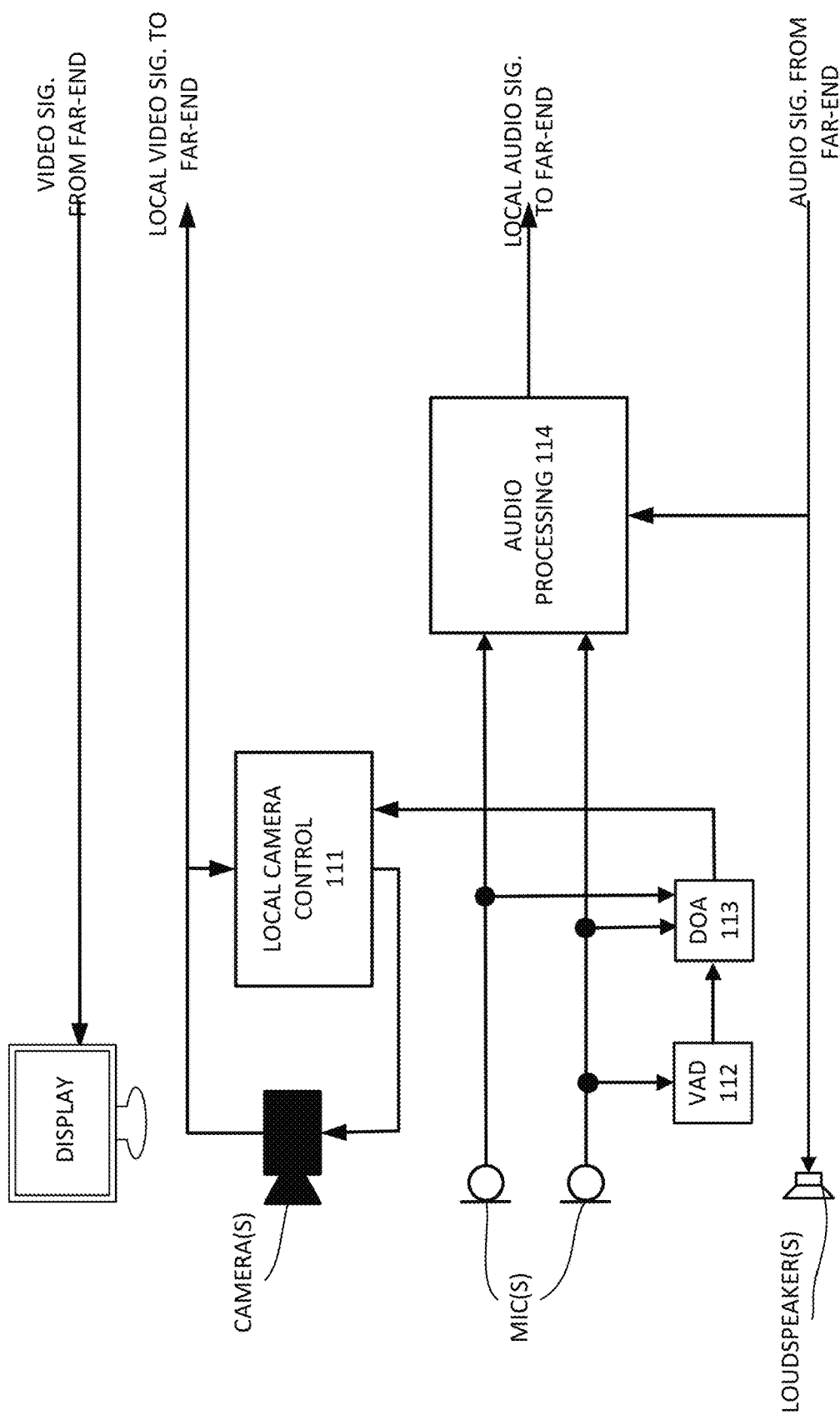
FIG. 4 is a diagram showing functional blocks comprising the video conference system 110.

FIG. 4 shows functionality comprising the conference system 110. In addition to the conference system functionality described with reference to FIGS. 1, 2, and 3, FIG. 4 shows a camera control module 111, audio processing functionality 114, voice activity detection (VAD) functionality 112, and direction of sound arrival (DOA) functionality 113. The operation of the VAD functionality 112 and DOA functionality 113 will be described later with reference to FIGS. 7 and 8 respectively, but generally the VAD functionality receives sound information from the microphones and examines this information for sound features associated with speech. The VAD 112 operates to set a speech flag during the time that the VAD detects speech, and while the DOA detects that the speech flag is set it operates to calculate a direction of arrival of sound captured by two or more microphones. The results of the calculated DOA are then available to the camera control module 111 which can use this DOA information to identify an active speaker and to control the pan, tilt, and or zoom of the system camera. More specifically, the direction of arrival of sound can be correlated with conference participant position mapping information to determine which one(s) are currently active speakers. As previously described, an active speaker is identified as an individual who has been speaking for longer than a configurable period of time. The audio processing functionality 114 performs a variety of microphone signal filtering operations that, among other things, removes acoustic echo from the microphone signal before being sent to a far-end system. The functionality comprising the camera control 111 will now be described in greater detail with reference to FIG. 5.

The camera control module 111 shown in FIG. 5 comprises active speaker detection functionality 200, participant or object (thing) information processing functionality 205, camera control logic 220, and an information store 215. The information processing 205 generally operates on image information captured by the conference system 110 camera to identify and label a target/thing of interest, such as a participant or object in the conference room 100 of FIG. 1, to identify features comprising the target of interest, to track and map the location of the things (objects and participants) with respect to the conference system or in the room, and to determine the orientation of a participant with respect to some reference direction. Some or all of the information comprising the store 215 can be maintained by any type of database system that associates or relates one type of information to another, such as the identity of a participant or object (thing ID), the location of the participant or object, participant features, participant orientation and speaker status.

Continuing to refer to FIG. 5, the active speaker detection function 200 generally operates on information maintained in the information store 215 to identify which of the participants identified by the information processing 205 are active speakers. The camera control logic 220 generally operates on information maintained in the store 215 to control the pan, tilt and zoom of the system 110 camera(s) based on information maintained in the store 215. The logic 220 is comprised of computer instructions maintained in a non-transitory computer readable medium associated with the system 110, such as physical or virtual disk space or any other type of suitable storage medium located either locally in association with the conference system 110 or remotely on a network to which the system is connected. FIG. 6 represents a more detailed illustration of functionality comprising the camera control functionality 111.

FIG. 6 illustrates functionality comprising the camera control module 111 of FIG. 5. The participant and object information processing 205 is comprised an image processing module 206, a mapping function 210 and an orientation determination function 211. The image processing module 206 is comprised of an identification and labelling function 207, a participant feature detection function 208, and a location and tracking function 209. The identification and labelling function 207 operates on camera image information to identify and label individual participants and objects of interest in the conference room 100. Each participant and object that is identified and labeled is maintained in a listing comprising a store 215. The functionality 207 can be implemented in any type of appropriate trainable, computer vision application that operates on image information received from the system camera to detect, identify and label things in the camera field of view. These things can be conference call participants located in the conference room or they can be, among other things, inanimate objects such as a whiteboard, chairs, tables, pens, laptop or other types of computers.

Feature detection functionality 208 comprising the image processing function 206 in FIG. 6 generally operates on system camera image information to identify features comprising each of the participants identified by the functionality 207. These features can be comprised of facial features such as eyes, ears, nose, and mouth, they can be arms, legs, or other torso features, or features associated with clothing worn by the participants. The feature detection functionality 208 can be implemented in a neural network that is trained to detect the different features used to determine an orientation of each participant. The location and tracking functionality 209 generally operate to determine the relative location of things in the conference room 100 that have already been identified and labelled by the functionality 207. Location information generated by the functionality 209 is maintained in the store 215 and can include two-dimensional coordinate information that locates things in the field of view of the camera. This coordinate information in conjunction with orientation information can be used by logic 225 to identify things that participants are looking at. The coordinates could be used to position things in the conference room in a 2-D grid structure (virtual map) representing a conference room floor plan. In the case of a two-dimensional map, an X,Y coordinate system can be used in which a set of one or more X coordinate values corresponds to horizontal pixel indices comprising a participant or object in the camera FOV, and the Y coordinate value is the distance from the camera to the thing. The Y coordinate value can be determined using distance information captured by a laser range finder associated with the conference system 110, and the X coordinate value information can be determined using digital image information generated by any digital image processing application such as the well-known MATLAB tool. The mapping function 210 can use the two-dimensional coordinate information generated by the location function 209 to construct the virtual map 212 that is illustrated with reference to FIG. 10.

Continuing to refer to FIG. 6, the participant orientation functionality 211 generally operates on feature information associated with each identified participant maintained in the store 215 to determine gaze and/or pose (together describing orientation) information relating to some or all of the participants within the field of view of the camera, and the resulting orientation information for each participant is maintained in the store 215. The orientation functionality can be implemented in a neural network (not shown) that can be trained to identify a gaze or pose of a participant based on a set of training features. The output of the neural network can be a participant orientation expressed as angular information in degrees with respect to a reference direction (i.e., participant 120D in FIG. 1 is oriented at an angle of one hundred and twenty degrees with respect to the reference direction). The reference can be a direction that is normal to a front plain of the system as illustrated in FIG. 8, and the identified orientation angle can be stored in association with each participant in the store 215. The information store 215 maintains relationships or associations between information, received from the object information processing 205 that can be utilized by a DOA to Participant Location Correlation function 201 comprising the active speaker detection function 200 to identify active speakers, and then send the active speaker information to the store 215 where it can be maintained. More specifically, the function 201 operates to correlate information received from the DOA 113 and location information maintained in the store 215 to identify which participant(s) are currently active speakers. This correlation can be determined in a number of different ways. For example, the information received from the DOA 113 can be an azimuth information of an audio source with respect to the conference system 110, and this azimuth information can be compared to the participant location information maintained in the store 215 which can be the set of X coordinate values associated with each participant. When a DOA value is compared to be the same (at least within some specified margin of error) as at least one of the X coordinate values associated with a participant, then the system 110 determines that this participant is currently an active speaker. In order to make this comparison, it may be necessary to convert the X coordinate values to an azimuth value, or vise-versa. But regardless of which information is converted, the correlation function 201 can compare the location information to the DOA information for a closest match, which identifies the location which can then be used to identify a participant that is an active speaker. Once an active speaker is identified, this information can be maintained and regularly updated in the store 215 in association with the participant identity.

The logic 225 in FIG. 6 can operate on information comprising the store 215 to determine what thing (participant of object), if any, each participant is looking at. More specifically, the logic can examine the participant orientation information and use this information to determine what thing (another participant or object) they are currently looking at, and then temporarily store the identity of this thing in memory associated with the store 215 comprising the conference system 110. More specifically, the logic 225 operates to determine the identity of a thing or target of interest that a participant is currently oriented towards (i.e., looking at) using orientation and location information maintained in the store 215. The orientation of each participant can be expressed as a ray originating at a participant location and pointing in the direction the participant is looking, and the logic 225 can use the participant orientation and the location information associated with other participants and the object location information maintained in the store 215 to determine a target of interest, which can then be maintained in the store 215. The object that a participant is looking at (target of interest) can be determined by extending the ray associated with the participant until it intersects with, or comes within a programmable margin of error of, coordinates defining the location of an object or other participant in the conference room. The coordinates of each intersection can be maintained at least temporarily in memory associated with the store 215 comprising the conference system 110. During a conference call, camera control logic 220 can examine and compare the location of a target of interest that each participant is looking at to identity common objects that the participants are oriented towards. Further, the logic 225 can operate to at least temporarily assign a coefficient value or weight to each thing identified in the camera FOV, with participants being assigned higher coefficient values than objects. In this regard, one participant can be assigned a higher coefficient weight than other participants, and one object can be assigned a higher coefficient weight than other objects in the conference room. Further, a participant(s) that is/are identified as an active speaker(s) can be assigned a higher coefficient value than non-speakers, and a white-board can be assigned a higher coefficient value than a laptop computer.

As described earlier, and according to one embodiment, once the orientations of each participant in a video conference call is determined, and once a target of interest that each participant is looking at is identified, the video conference system camera can be automatically controlled to focus on the thing that a highest priority participant is looking at. Alternatively, if no active speaker is detected, then the system 110 camera can be controlled to focus on a highest priority thing (participant or inanimate object) that any of the participants are oriented towards. The camera control logic 220 shown in FIG. 6, will be described later in more detail with reference to FIG. 11, but it generally operates on information maintained in the store 215 to generate system camera pan, tilt and zoom control signals.

FIG. 7 is a diagram showing a format in which different types of information described earlier with reference to FIG. 6 and comprising the information store 215 can be maintained. The I.D. list maintains the identity of each participant and object identified and labeled by the function 207, the features list maintains feature information associated with each identified participant, the location list maintains a set of coordinate information associated with each participant and object, the orientation list maintains participant orientation information in a form that can be used by the logic 225 to determine what a participant is looking at. In this case, the orientation information is angular information in degrees offset from a reference line that is normal to the front plain of the system 110. The speaker status list maintains active/inactive speaker information associated with each participant, and the target list maintains the identify of a current thing that each participant is looking at, whether that thing is another participant or an object.

FIG. 8 is an illustration of a virtual map showing some of the information comprising the store 215.

Turning now to a description of the VAD 112 shown in FIG. 9. The voice activity detection unit (VAD) 112 carries out an analysis of various voice features in a voice signal using a neural network 57. The VAD outputs a voice flag when it is determined that a sound signal captured by a microphone is analyzed to be a human voice or speech activity.

The following are examples of various voice features that can be used when analyzing a sound signal for speech activity: zero-crossing rate 41, harmonic power spectrum 42, power spectrum change rate 43, power spectrum flatness 44, formant intensity 45, harmonic intensity 46, power 47, first-order difference of power 48, second-order difference of power 49, cepstrum coefficient 51, first-order difference of cepstrom coefficient 52, and second-order difference of cepstrom coefficient 53.

The zero-crossing rate 41 calculates the frequency of appearance of a point that crosses zero for a voice signal in the time domain. Zero cross corresponds to the pitch which is the fundamental frequency of the voice. The harmonic power spectrum 42 indicates what degree of power the frequency component of each harmonic included in the voice signal has. The power spectrum change rate 43 indicates the rate of change of power to the frequency component of the voice signal. The power spectrum flatness 44 indicates the degree of the swell of the frequency component of the voice signal. The formant intensity 45 indicates the intensity of the formant component included in the voice signal. The harmonic intensity 46 indicates the intensity of the frequency component of each harmonic included in the voice signal. The power 47 is the power of the voice signal. The first-order difference of power 48, is the difference from the previous power 47. The second-order difference of power 49, is the difference from the previous first-order difference of power 48. The cepstrum coefficient 51 is the logarithm of the discrete cosine transformed amplitude of the voice signal. A first-order difference 52 of the cepstrum coefficient is the difference from the previous cepstrum coefficient 51. A second-order difference 53 of the cepstrum coefficient is the difference from the previous first-order difference 52 of the cepstrum coefficient.

Note that a voice signal emphasizing a high frequency may be used when finding the cepstrum coefficient 51 by using a pre-emphasis filter, and a discrete cosine transformed amplitude of the voice signal compressed by a mel filter bank may be used.

Note that the voice features are not limited to the parameters described above, and any parameter that can discriminate a human voice from other sounds may be used.

The neural network 57 is a method for deriving results from a judgment example of a person, and each neuron coefficient is set to an input value so as to approach the judgment result derived by a person.

The neural network 57 outputs a predetermined value based on an input value by inputting the value of various voice features (zero-crossing rate 41, harmonic power spectrum 42, power spectrum change rate 43, power spectrum flatness 44, formant intensity 45, harmonic intensity 46, power 47, first-order difference of power 48, second-order difference of power 49, cepstrum coefficient 51, first-order difference of cepstrum coefficient 52, or second-order difference of cepstrum coefficient 53) in each neuron. The neural network 57 outputs each of a first parameter value, which is a human voice, and a second parameter value, which is not a human voice in the final two neurons. Finally, the neural network 57 determines that it is a human voice when the difference between the first parameter value and the second parameter value exceeds a predetermined threshold value. By this, the neural network 57 can determine whether the voice is a human voice based on the judgment example of a person.

Next, FIG. 10 is a functional block diagram illustrating the configuration of the direction of arrival (DOA) unit 113, and FIG. 11 is a flowchart illustrating the operation of the direction of arrival (DOA) detection unit 113. Turning first to the DOA unit 113 in FIG. 10, this unit is provided with discrete Fourier transforms DFT 61A and DFT 61B, a cross-correlation function calculation unit 62, a phase rotation unit 63, an inverse discrete Fourier transform (IDFT) 64, sample number calculation unit 65, time displacement calculation unit 66, an adder 67, and an angle of arrival calculation unit 68. The DFT 61A and DFT 61B respectively receive the collected sound signal of the system 110 microphones. The DFT 61A and the DFT 61B carry out the Fourier transformation on the collected sound signal $X1(t)$ and the collected sound signal $X2(t)$, and transform them into signal $X1(\omega)$ and $X2(\omega)$ of the frequency domain as shown in FIG. 10 and at S21 in FIG. 11.

The cross-correlation function calculation unit 62, in FIG. 10, calculates the whitening cross spectrum R ($\omega$) of the collected and transformed sound signals $X1(t)$ and $X2(t)$ following formula 1 below (S22). A predetermined time constant is applied to the whitening cross spectrum R ($\omega$).

$$R(\omega) = a \cdot R(\omega) + (1-a) \cdot \frac{conj(X1(\omega)) \cdot X2(\omega)}{|conj(X1(\omega)) \cdot X2(\omega)|} \quad \text{Formula 1}$$

The calculated whitening cross spectrum R($\omega$) is input to the phase rotation unit 63 and the IDFT 64. The IDFT 64 carries out inverse transformation on the whitening cross spectrum R($\omega$) which results in a whitening cross-correlation function r(t).

The sample number calculation unit 65 finds the peak position index of the whitening cross-correlation function r(t). The sample number corresponding to the position of the peak represents the difference in time of arrival between microphone 11 and microphone 13. The sample number calculation unit 65 finds the difference in time of arrival (first difference in time of arrival, $\tau_i$) of sound from the sound source to the microphone 11 and to the microphone 13 by dividing the peak position index by the sampling frequency as shown in formula 2 below. This first difference in time of arrival is expressed as an integer value of one or more sample times. For example, if a sample rate is 48 KHz, then the time from one sample to the next (inter-sample time) is approximately 20.8 microseconds, and if the sample number calculation unit determines that the sound arrives at a second microphone one sample time after it arrives at a first microphone, then this delay is equal to at least 20.8 microseconds.

$$\tau_i = \frac{\text{PEAK\_INDEX}(r(t))}{fs} \quad \text{Formula 2}$$

Note that the sample number calculation unit 65 may find the cross-correlation function of the collected sound signal of the microphone 11 $X1(t)$ and the collected sound signal of the microphone 13 $X2(t)$ in the time domain, or the whitening cross-correlation function, and calculate the first difference in time of arrival. Furthermore, the sample number calculation unit 65 may find the time when each of the collected sound signal $X1(t)$ and the collected sound signal $X2(t)$ are at their peak level (time when the largest value of amplitude is given), and calculate the first difference in time of arrival from the difference in this peak level time, but this time is not more accurate than one sample time.

Because this first difference in time of arrival, $\tau i$, of a sample is a time difference corresponding to when the cross-correlation function or whitening cross-correlation function shows a peak, it cannot obtain accuracy equal to or greater than the sampling frequency (i.e., 20.8 microseconds). Therefore, the DOA 60 of the present embodiment calculates a second, fractional difference in time of arrival value, which is a difference in time of arrival of one sample by correcting the whitening cross spectrum R ($\omega$) based on the first difference in time of arrival, and analyzing the corrected whitening cross spectrum R' ($\omega$). This second difference in time of arrival is a fractional value that is less than one sample time.

In other words, the phase rotation unit 63 first rotates the phase of the whitening cross spectrum R ($\omega$) using the first difference in time of arrival $T_1$ as illustrated in formula 3 below (S26).

$$R'(\omega) = e^{-i\omega(-\tau i)} \cdot R(\omega) \quad \text{Formula 3}$$

The whitening cross spectrum R($\omega$) is an angular frequency function. The DOA 113 computes the slope of these phase values which corresponds to the difference in time of arrival of the audio signal. This time difference is expressed as an integer number of audio samples. However, because the phase values are not smooth in the angular frequency domain, calculating the slope accurately from it is a challenge. To resolve this, the whitening cross spectrum R($\omega$) is transformed to the time domain. By calculating the sample number corresponding to the peak of the transformed whitening cross spectrum, the first difference in time of arrival $\tau i$ (offset) is obtained. The phase rotation unit 463 rotates the phase of the original whitening cross spectrum R ($\omega$) using this newly obtained time offset $\tau i$. Subsequently, the time displacement calculation unit 66 obtains a subsample delay $\tau f$ from the slope of this rotated whitening cross spectrum R'($\omega$) using a least squares fit (as shown below in formulas 4 and 5), and this subsample delay $\tau f$ is referred to herein as a second difference in time of arrival.

$$\alpha(\omega) = \tan^{-1} \frac{img(R'(\omega))}{real(R'(\omega))} \quad \text{Formula 4}$$

$$\tau_f = -\frac{\sum \alpha(\omega) \cdot \omega}{\sum \omega^2} \quad \text{Formula 5}$$

Further, because accuracy decreases in the high frequency domain when the sound source type is voice, it is desirable to remove at least a portion of the high frequency component from the sound signal sample (i.e., frequencies above 2 kHz can be removed).

Subsequent to calculating the first and second time difference of arrival times, the adder 67 calculates an actual or third difference in time of arrival τ (total time difference of arrival) by adding the first difference in time of arrival τi and the second difference in time of arrival τf.

Finally, the angle of arrival calculation unit 68 finds the direction of arrival of the voice (θ) using the third difference in time of arrival τ (S29).

As described earlier with reference to FIGS. 5 and 6, the camera control logic 220 operates to generate camera signals used to focus the camera FOV to a target of interest, whether the target is a participant or an object. Among other things, the logic 220 can use participant information, speaker status information and target information maintained in the store 215 to generate the necessary signals to control the system camera. The logical process described with reference to FIGS. 12A and 12B can be implemented in logical instructions that are stored in any appropriate non-transitory computer readable medium associated with the conference system 110. It should be understood, that while the processes described in FIGS. 12A and 12B rely upon a participant orientation, orientation in this context can be determined using either or both of gaze information and pose information. In some cases, it is not possible to detect participant gaze information when the participant is looking away from the conference system. In this case, pose information can be used to determine orientation. Or, in the case where only one eye is visible to the conference system camera, an accurate orientation determination can be determined using both gaze and pose information. Also, the logic process in FIGS. 12A and 12B assumes that there is only one camera associated with the conference system, but it should be understood that two or more cameras associated with the conference system 110 can be located at different positions in a conference room, and any one or more of these cameras can operate to capture images depending upon the location of a thing in the conference room. So, in the event that an image of a thing of interest, such as a participant who is speaking, is best captured by one camera as opposed to any of the other cameras, the system 110 can operate to activate that camera to capture images.

The camera control logic 220 illustrated in FIG. 12A is initiated at the start of a video conference call, and at 10 immediately starts examining the list of identified things and the speaker status information associated with each participant that is maintained in the store 215. If at 15 the logic detects that one of the identified participants is an active speaker, then the process proceeds to 20 where it determines whether the speaker is oriented towards something (target) that is identified by the conference system 110. If at 20 the logic determines that the speaker is oriented towards a thing in the list of identified things, then the process proceeds to 25 where the logic determines whether the thing identified in 20 is the system 110, and if so, the process proceeds to 30 and the system generates a camera control signal that causes the camera to focus on the speaker. On the other hand, if at 20 it is determined that the speaker is not oriented towards a thing, then the process goes to 75 and the camera is control to focus on a highest priority thing identified by the system. Returning to 25, if the thing identified in 20 is not the system 110, then the process proceeds to 35 in FIG. 12B and the location of the thing identified in 20 is examined and in 40 the system camera is controlled to focus on the location associated with the thing.

Referring back to 15, if at this point an examination by the logic of the speaker status of each participant indicates that there is currently no active speaker, then the process proceeds to 45 at which point it determines whether or not any identified participant is oriented towards something comprising the ID List in the information store 215. If a participant is oriented towards something in the list, then at 50 the logic determines the identity of the thing of interest associated with each participant, and at 55 determines whether or not a majority of the participants are oriented towards the same thing. If at 55 the majority are oriented towards the same thing, then at 60 the logic determines whether the thing is the system 110, and if so, the system uses a default camera setting to control the camera. This default setting can control the camera to focus on every person in the room, for example. However, if at 60 the logic determines that the majority of the participants are not looking at the system 110, then the camera is controlled to focus on the thing identified at 55.

Referring back to 55, if the logic determines that the majority of the participants are not oriented towards the same thing, then the process proceeds to 75 where the camera is controlled to focus on the highest priority thing.

Referring back to 45, if the logic determines that no participants are oriented towards something in the list of identified things maintained in the store 215, then at 80 the logic generates and sends a default camera control signal to the system camera and the process returns to 10. This default signal can control the camera to focus on all participants in the conference room 100, for example.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for controlling the operation of a camera associated with a video system, comprising:
    detecting and uniquely identifying, using computer instructions maintained in a non-transitory computer readable medium in association with the video system, each one of a plurality of things in a room, wherein the things are comprised of one or more participants and one or more objects in a room;
    determining a current two-dimensional coordinate location of each of the things in the room with respect to the video system;
    determining whether each participant is oriented towards an identified thing in the room by detecting current orientation information of each participant and comparing the orientation information of each participant to the current two-dimensional coordinate location of each of the other things in the room;
    determining that a majority of the participants are oriented towards the same thing; and
    controlling the system camera to focus on the thing that the majority of the participants in the room are oriented towards.

2. The method of claim 1, wherein the objects comprise a whiteboard, a personal computer, and the video system.

3. The method of claim 2, wherein each of the objects and participants are assigned a priority.

4. The method of claim 3, wherein participants are assigned a higher priority than objects.

5. The method of claim 3, wherein objects are assigned a higher priority than participants.

6. The method of 3, wherein the assigned priority is a weighted coefficient value.

7. The method of claim 1, further comprising determining that the majority of the participants are not oriented towards the same thing, and controlling the camera to focus on the thing assigned the highest priority.

8. The method of claim 1, further comprising if it is determined that no participants are oriented towards something, then sending a default control signal to the camera.

9. The method of claim 8, wherein the default signal controls the camera to focus on all participants at the same time.

10. The method of claim 1, wherein participant orientation is determined using either gaze information, pose information or both gaze and pose information.

11. The method of claim 1, further comprising the video system having an additional one or more cameras that are connect to and remote from the video system, and the video system operating to select one of the remote cameras that is in an optimal position to capture an image of the thing that the majority of the participants are oriented towards.

12. A method for controlling the operation of a camera associated with a video system, comprising:
    detecting and uniquely identifying each one of a plurality of things in a room, wherein the things comprise one or more call participants and objects in room;
    determining a current two-dimensional coordinate location of each of the things in the room with respect to the video system;
    detecting that at least one of the participants is an active speaker and oriented toward one of the things in the room by detecting current orientation information of the active speaker and comparing this orientation information to the current two-dimensional coordinate location of each of the other things in the room; and
    controlling the video system camera to focus on the location of the thing that the active speaker is oriented towards.

13. The method of claim 12, wherein the objects comprise a whiteboard, a personal computer, and the video system.

14. The method of claim 13, wherein each of the objects and participants are assigned a priority.

15. The method of claim 14, wherein the active speaker is the highest priority participant.

16. The method of claim 14, wherein participants are assigned a higher priority than objects.

17. The method of claim 14, wherein the assigned priority is a weighted coefficient value.

18. The method of claim 13, wherein the whiteboard is the highest priority object.

19. The method of claim 13, further comprising determining that the majority of the participants are not oriented towards the same thing, and controlling the camera to focus on the thing assigned the highest priority.

20. The method of claim 13, further comprising if it is determined that no participants are oriented towards something, then sending a default control signal to the camera.

21. The method of claim 20, wherein the default signal controls the camera to focus on all participants at the same time.

22. The method of claim 13, wherein participant orientation is determined using either gaze information, pose information or both gaze and pose information.

23. The method of claim 12, further comprising the video system having an additional one or more cameras that are connect to and remote from the video system, and the video system operating to select one of the remote cameras that is in an optimal position to capture an image of the active speaker.

24. A video system, comprising:
    a display;
    one or more microphones and loudspeakers;
    one camera;
    voice activity and direction of arrival of sound detection functionality;
    audio processing functionality; and
    camera control functionality:
        wherein, the camera control functionality comprises computer instructions maintained in a non-transitory computer readable medium that operates on video image and distance information received from the camera, and direction of arrival of sound information received from the direction of arrival function to detect and identify things in a room in which the video system is running, to determine a current two-dimensional coordinate location of each identified thing, to determine what thing each one of one or more video call participants is oriented towards, to determine that a majority of the participants are oriented towards the same thing, and controlling the camera to focus on the thing that the majority of the participants are oriented towards;
    wherein the thing that each participant is oriented towards is determined by detecting current orientation information of each participant and comparing the orientation information of each participant with the current two-dimensional location of each of the other things in the room.

* * * * *